(12) United States Patent
Schneider et al.

(10) Patent No.: US 9,503,429 B2
(45) Date of Patent: *Nov. 22, 2016

(54) SYSTEMS FOR FINDING A LOST TRANSIENT STORAGE DEVICE

(71) Applicant: MICROSOFT TECHNOLOGY LICENSING, LLC, Redmond, WA (US)

(72) Inventors: Janet Schneider, Bellevue, WA (US); Emily Wilson, Seattle, WA (US); Vladimir Sadovsky, Redmond, WA (US); Robin Alexander, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/515,428

(22) Filed: Oct. 15, 2014

(65) Prior Publication Data
US 2015/0040206 A1 Feb. 5, 2015

Related U.S. Application Data

(63) Continuation of application No. 12/042,060, filed on Mar. 4, 2008, now Pat. No. 8,881,309.

(51) Int. Cl.
*H04L 29/06* (2006.01)
*G06F 11/00* (2006.01)

(52) U.S. Cl.
CPC ............ *H04L 63/029* (2013.01); *G06F 11/006* (2013.01); *H04L 63/0478* (2013.01)

(58) Field of Classification Search
CPC .................. H04L 63/029; H04L 63/0478
USPC ...................................... 726/24, 34
See application file for complete search history.

(56) References Cited

U.S. PATENT DOCUMENTS

| 6,433,685 | B1 | 8/2002 | Struble et al. |
| 6,587,441 | B1* | 7/2003 | Urban ............... H04L 1/1867 370/310 |

(Continued)

OTHER PUBLICATIONS

Basic Security Safeguards for Pocket PC http://www.pdastreet.com/articles/2005/9/2005-9-13-Basic-Security-Safeguards2 .html, Sep. 13, 2005.

(Continued)

*Primary Examiner* — Hadi Armouche
*Assistant Examiner* — Ali Shayanfar
(74) *Attorney, Agent, or Firm* — Sunah Lee; Dan Choi; Micky Minhas (57) ABSTRACT

Processes for identifying and recovering a lost transient storage device are provided. In some processes, information regarding the owner of the device is obtained. The device ownership information may be stored on a remote service with which the device is registered and/or may be stored on the device itself. In one process, the remote service provides the device with customized device-executable code when the device is registered. The device may also contain information regarding trusted systems. The process includes obtaining status information indicating whether a device is lost when the device is connected to a host system. In some processes, the status is determined by a remote service. In other processes, the status is determined by the device. If the device is lost then a device recovery plan is executed. Portions of a device recovery plan may be executed on the remote service, the host system, and/or the device.

20 Claims, 8 Drawing Sheets

(56) References Cited

U.S. PATENT DOCUMENTS

| | | | |
|---|---|---|---|
| 6,804,699 B1* | 10/2004 | Henrie | G06F 21/31 709/203 |
| 6,813,498 B1* | 11/2004 | Durga | H04W 68/00 340/568.1 |
| 6,836,212 B2 | 12/2004 | Sawinski | |
| 6,937,869 B1* | 8/2005 | Rayburn | G01C 21/20 340/990 |
| 6,950,946 B1 | 9/2005 | Droz et al. | |
| 7,054,594 B2 | 5/2006 | Bloch et al. | |
| 7,230,534 B2 | 6/2007 | Elledge | |
| 7,231,359 B2 | 6/2007 | Parulski | |
| 7,263,441 B1 | 8/2007 | Janky et al. | |
| 7,440,465 B2 | 10/2008 | Park | |
| 7,478,235 B2 | 1/2009 | England et al. | |
| 7,496,201 B2 | 2/2009 | Westin | |
| 7,783,281 B1 | 8/2010 | Cook et al. | |
| 7,836,493 B2 | 11/2010 | Xia et al. | |
| 2001/0052855 A1 | 12/2001 | Ogilvie | |
| 2002/0049662 A1* | 4/2002 | Oshima | G06Q 20/02 705/37 |
| 2003/0005161 A1* | 1/2003 | Chen | G06F 17/30575 709/248 |
| 2003/0065934 A1 | 4/2003 | Angelo et al. | |
| 2003/0074577 A1 | 4/2003 | Bean et al. | |
| 2003/0219034 A1 | 11/2003 | Lotter et al. | |
| 2004/0172531 A1* | 9/2004 | Little et al. | 713/155 |
| 2004/0203601 A1 | 10/2004 | Morriss et al. | |
| 2005/0195975 A1* | 9/2005 | Kawakita | H04L 9/0822 380/30 |
| 2005/0197099 A1* | 9/2005 | Nehushtan | 455/410 |
| 2006/0029062 A1* | 2/2006 | Rao et al. | 370/389 |
| 2006/0055538 A1 | 3/2006 | Ritter | |
| 2006/0122955 A1* | 6/2006 | Bethlehem | H04L 63/102 |
| 2006/0181411 A1* | 8/2006 | Fast | G01S 5/0018 340/539.13 |
| 2006/0204047 A1 | 9/2006 | Dave et al. | |
| 2006/0212270 A1* | 9/2006 | Shiu | H04L 63/126 702/188 |
| 2006/0253904 A1* | 11/2006 | Bhansali | G06F 21/572 726/13 |
| 2006/0272034 A1 | 11/2006 | Bhansali et al. | |
| 2007/0082676 A1 | 4/2007 | Bhogal et al. | |
| 2007/0174616 A1* | 7/2007 | Buer | H04L 63/0428 713/168 |
| 2007/0192584 A1* | 8/2007 | Bajar et al. | 713/150 |
| 2007/0234059 A1* | 10/2007 | Ohara | H04L 63/0823 713/176 |
| 2007/0283142 A1* | 12/2007 | Milstein | H04L 63/08 713/155 |
| 2007/0299918 A1* | 12/2007 | Roberts | G06Q 10/107 709/206 |
| 2008/0005432 A1 | 1/2008 | Kagawa | |
| 2008/0090548 A1* | 4/2008 | Ramalingam | H04M 11/04 455/404.2 |
| 2008/0095070 A1* | 4/2008 | Chan | H04L 63/0272 370/254 |
| 2008/0119184 A1* | 5/2008 | Rebo | H04L 63/0869 455/433 |
| 2008/0186162 A1* | 8/2008 | Rajan | G06F 21/88 340/539.13 |
| 2008/0189554 A1* | 8/2008 | Ali | G06F 13/10 713/189 |
| 2008/0192933 A1* | 8/2008 | Bertin | G06F 21/445 380/258 |
| 2008/0212781 A1* | 9/2008 | Vennelakanti | G06F 21/6218 380/277 |
| 2008/0215720 A1* | 9/2008 | Westin | H04L 12/2602 709/224 |
| 2009/0042598 A1* | 2/2009 | Blinnikka | H04M 1/66 455/550.1 |
| 2009/0061820 A1* | 3/2009 | Patel | H04W 12/06 455/411 |
| 2009/0097633 A1* | 4/2009 | James et al. | 379/215.01 |
| 2009/0161624 A1 | 6/2009 | Johnson et al. | |
| 2009/0163175 A1* | 6/2009 | Shi et al. | 455/411 |
| 2009/0170490 A1* | 7/2009 | Brabson | H04L 67/1038 455/418 |
| 2010/0260180 A1* | 10/2010 | Wu | H04L 1/1819 370/390 |

OTHER PUBLICATIONS

Web-based GPS Tracking System Helps Owners Find Missing Pets http://www.new-jersey.ws/modules.php?name=News&file=article &sid=19581, Sep. 6, 2007.

IIWPO; http://wiki.xda-developers.com/index.php?pagename=IIWPO, Jul. 5, 2006.

U.S. Appl. No. 12/042,060, filed Mar. 4, 2008, Schneider.

* cited by examiner

SYSTEMS FOR FINDING A LOST TRANSIENT STORAGE DEVICE

RELATED APPLICATION(S)

This application is a Continuation of, and claims benefit from, U.S. patent application Ser. No. 12/042,060 that was filed on Mar. 4, 2008, and that is incorporated herein by reference in its entirety.

BACKGROUND

Many different types of devices having storage, such as flash drives, digital cameras, digital media players, etc. are portable allowing the device to be connected to one or more host systems, such as personal computers. The portability of these devices provides increased convenience and flexibility for a device user. However, the increasing popularity of portable devices having storage and the decreasing size of many such devices increase a risk that such a device may be lost or misplaced. An owner of a lost device may have significant incentives to seek return of the device. A lost transient storage device may be of significant monetary value, such as a digital camera, a digital media player, a medical testing device (like a glucose meter), etc. Alternatively, a lost device may be of little monetary value, but the information stored in the device may have great monetary value or great sentimental value.

A lost device that does not support communication with a communication network, such as a flash drive, cannot initiate communication with its owner through a communication network or receive communication from its owner through a communication network, except through a connection with a host system. Additionally, a person who finds a lost device, such as a flash drive, and would like to return it may have no way of knowing the identity of the device owner or how to contact the device owner. The owner of the device may have no way of finding out if the device has been found and if anyone has attempted to read information off of the device.

SUMMARY OF INVENTION

Applicants have appreciated that a process for identifying and recovering lost transient storage devices is needed. Embodiments of the invention provide processes for identifying and recovering a lost transient storage device. One embodiment allows an owner of a device to register the device with a remote service and/or store information on the device that specifies trusted host systems. The device owner may provide contact information and/or a selection of a recovery plan when the device is registered. Custom device-executable code may be downloaded onto the device when the device is registered. When the device is connected to a host system, the device obtains status information indicating whether the device is a lost device. If the device is lost then a recovery plan is executed. The recovery plan may include providing a user of the host system with device owner contact information and instructions regarding how to return the device to the device owner. The device recovery plan may also provide the owner of the device with an alert that the device has been found. In another embodiment, the remote service may establish a secure link with the device through the host system. A secure tunneling channel between the remote system and the device may be provided by the host system. Custom device-executable code may be received by the device from the host system through the secure tunneling channel and then executed by the device as part of a device portion of the recovery plan.

In one embodiment, the process includes establishing communication between a host system and a device connected with the host system. The process also includes obtaining status information indicating whether the device is lost and executing a device portion of a recovery plan if the device status is lost.

In another embodiment, the process includes receiving trusted system information and storing the trusted system information in storage of the device. In one embodiment, obtaining status information includes obtaining system identification information from the host system and comparing the obtained system identification information with the trusted system information. A status of the device is determined based on the comparison.

In another embodiment, obtaining status information indicating whether the device is lost includes providing device identification to a host system and receiving status information from the host system indicating whether the device is lost. The status information is obtained by the host system from a remote service using the device identifying information.

In one embodiment, the process includes receiving device-executable code from the remote service. In one embodiment, the device-executable code is received from the remote service during registration of the device with the remote service before the device is lost. In another embodiment, the device-executable code is received from the remote service through the host system. In another embodiment, device-executable code is received from the remote service during registration of the device and additional device-executable code is received from the remote service through the host system. The device-executable code may implement one or more embedded applications. The device-executable code may include an embedded application that is executed when the host system initiates authentication. Executing the device portion of the recovery plan may include executing an embedded application that is received by the device or that is preloaded on the device.

In one embodiment, device-executable code that is received from the remote service includes an embedded application that is customized based on selections made by the device owner. In another embodiment, device-executable code that is received from the remote service is specific to the remote service.

In another embodiment, executing the device portion of the recovery plan includes communicating with a remote service through a secure tunneling channel provided by the host system. Device-executable code received from the remote service may be received through a secure tunneling channel. In yet another embodiment, executing the device portion of the recovery plan includes blocking host system access to a secure portion of storage of the device, and enabling querying for owner information in an accessible portion of the device storage.

In another embodiment, executing a device portion of the recovery plan includes requesting further information from the user through the host system, and providing recovery information to the user, wherein an amount and a type of the recovery information provided is determined based on the further information. The recovery information may include contact information for a device owner, contact information for a device recovery service and/or device identification information.

A process for identifying and recovering a lost transient storage device using a host system is provided, according to another embodiment. The process includes initiating authentication of a transient storage device by the host system after the device is connected with the host system. The process also includes receiving device identifying information from the device and sending the device identifying information to a remote service. The process also includes receiving status information from the remote service based on the device identifying information, the status information indicating whether the device is lost. The process also includes executing a host portion of a device recovery plan if the device status is lost.

In one embodiment, the host portion of the recovery plan is obtained from the remote service. In another embodiment, the host portion of the recovery plan is obtained from the device. In one embodiment, executing the host portion of the device recovery plan includes providing a communication tunnel between the device and the remote service.

A process for identifying and recovering a lost transient storage device using a remote service is provided, according to yet another embodiment. The process includes receiving device-identification information for a transient storage device and receiving owner-identification information for an owner of the transient storage device. The process also includes receiving an indication that the device is lost. The process further includes providing information to a host system when provided with the device identifying information by the host system, wherein the information provided to the host system includes an indication that the device status is lost. In one embodiment, the process also includes receiving a device owner selection of a recovery plan from the device owner.

Another embodiment is a computer readable medium holding instruction for executing any of the processes described herein.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention provide processes for identifying and recovering a lost transient storage device. In one embodiment, before the device is lost, information regarding the owner of the device is obtained. This device ownership information may be stored on a remote service with which the device is registered and/or may be stored on the device itself. Additionally information, such as a selection of a recovery plan may be obtained before the device is lost. In one embodiment, the device receives and stores information regarding trusted systems before it is lost. In another embodiment, the device receives and stores device-executable code before it is lost. The device-executable code may be customized based on owner selections. When the device is connected to a host system, the device obtains status information indicating whether the device is a lost device. In one embodiment, the device may determine whether it is lost by comparing identification information received from the host system to trusted system information stored in the device. In another embodiment, a device owner provides information to a remote service indicating that the device is lost. The device may provide the host system with device identification information and receive information regarding whether the device is lost from the remote service through the host system. If the device is lost then a device recovery plan is executed. The recovery plan may be executed on any combination of the device, the remote service and the host system.

In one embodiment, the recovery plan includes execution of device-executable code that was stored in the device before the device was lost. In another embodiment, the recovery plan includes execution of device-executable code that is received by the device after the device is lost. The device-executable code may be provided by a remote service. The device-executable code may be provided by an application executing on an owner system to which the device is attached. In one embodiment, the device-executable code received by the device may be customized based on selections by the device owner. The device-executable code may be specific to the provider of the code (e.g. the remote service, the application executed on the owner system, etc.). The device-executable code may be obtained from other suitable sources, as the invention is not limited in this respect.

When the owner provides the device ownership information, the owner may also select a recovery plan to be executed when it is determined that the device is lost. The device recovery plan may include providing device owner contact information to a finder of the device, sending communication to the device owner that the device has been found and/or sending location information for the device or location information for the host system to which the device is attached. In one embodiment, device-executable code received by the device is customized based on an owner's selection of a device recovery plan.

In one embodiment, the device recovery plan includes deleting information from a portion of the device storage. In another embodiment, the device recovery plan includes blocking host system access to a secure portion of storage of the device while allowing querying for owner information in an accessible portion of the device storage.

In one embodiment, the status information is obtained using a remote service. The owner may register the device with a remote service and notify the remote service when the device is lost. The device may provide device identification information to a host system, which provides the device identification information to the remote service. If the device identification information provided by the host system matches device identification information for a device reported lost, then the remote service may send information to the host system indicating that the device connected to the remote service is a lost device and/or initiate a secure tunneling channel with the device provided by the host system.

In a different embodiment, the device may determine if it is a lost device. Before the device is lost, the owner of the device may store trusted system information on the device. When the device is connected to the host system, the device may receive system identification information from the host system. By comparing the received host system identification information and the trusted system information, the device determines whether it is lost.

A portion of the device recovery plan may be executed on the device, a portion of the device recovery plan may be executed by the remote service, and a portion of the device recovery plan may be executed on the host system. Further, the recovery plan may be executed by any combination of the device, the host system and the remote service, as the invention is not limited in this respect. In one embodiment, the device recovery plan includes providing owner contact information to a user of the host system. In another embodiment, the device recovery plan includes alerting the device owner that the device is found. The device recovery plan may include providing information about the host system to the device owner.

In one embodiment, the device recovery plan includes executing an embedded application on the device. Embedded applications stored on the device may have been preloaded on the device before the owner obtained the device or may have been received by the device in the form of device-executable code. In another embodiment, an embedded application may establish a secure tunneling channel between the device and the remote service provided by the host system.

Figure 1:
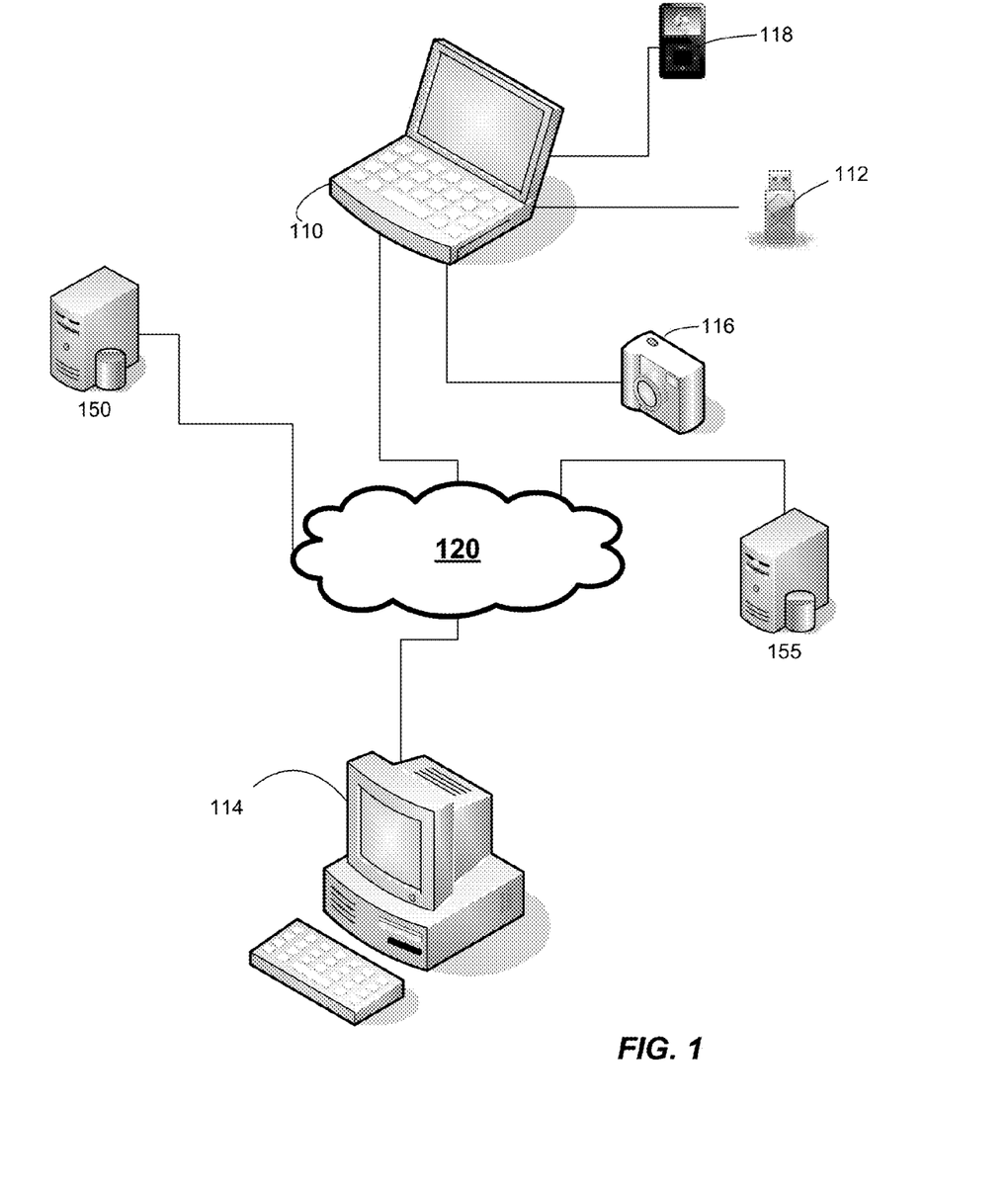
FIG. 1 is a sketch of an environment for implementation of some embodiments of the invention including an owner system, a transient storage device, a host system and a remote service.

Turning now to the figures, an example environment for implementation of embodiments of the invention is depicted in FIG. 1. Various transient storage devices, such as a flash drive 112, a digital camera 116 and a media player 118, are shown connected with a host system 110. Embodiments of the invention can be implemented using devices that include, but are not limited to: external hard drives, optical drives, flash drives 112, digital cameras 116, media players 118, etc. Solely for illustrative purposes, the transient storage device will be described with respect to a flash drive 112; however, other devices may be employed, as the present invention is not limited in this regard.

As used herein, an "owner" of a device is not limited to a legal owner of the device and is not necessarily a single person. An owner of a device is a person, a group of persons or an organization to whom the device belongs, who have permission or authorization to use the device, who are responsible for the device, who purchased the device or who had possession of the device before the device is lost. As used herein, in a description of an embodiment, an owner may be one person with respect to one portion of the embodiment and another person with respect to another portion of the embodiment. The owner that loses a device may not be an owner that stored information on the device before the device was lost. The term owner will be used to describe all of the aforementioned parties and others interchangeably throughout the application.

FIG. 1 shows two systems that may connect to transient storage devices. The system of the owner of the device 112 will be referred to as the owner system 114 and the system of the person that finds the device 112 will simply be referred to as the host system 110. Any properties or aspects described with respect to the host system 110 may be properties or aspects of the owner system 114. The owner system 114 and the host system 110, which may communicate with one or more devices having storage, may be computers 110, or any type of devices or systems having suitable processing capabilities, an operating system and a graphical user interface. The host system 110 and the owner system 114 may wirelessly connect with a transient storage device or the host system 110 and the owner system 114 may have a "wired" connection with the device.

In some embodiments, a remote service 150 may receive and/or distribute information regarding the transient storage device 112 and/or information regarding the owner of the transient storage device 112. The remote service 150 may receive information regarding the transient storage device 112 from the owner of the device 112, from a program executing on the owner's system 114, from a manufacturer or dealer of the device 112 (a device provider), an operating system provider, a provider of a third party application and/or another party, as the invention is not limited in this regard. Further, the remote service 150 may provide information and/or applications to the host system 110, and may provide information and/or executable code to the device 112 through the host system 110.

In some embodiments, a second remote service 155 may receive and/or distribute information regarding the transient storage device 112 and/or information regarding the owner of the transient storage device 112. In some embodiments, the second remote service 155 receives device identifying information from a device and receives owner information from the owner, from a retailer that sells the device to the owner, etc. In some embodiments, a second remote service 155 receives device information and owner information and the remote service 150 communicates with a host system 110 and distributes information and/or executable application(s). In this description, any action or actions of one remote service may be spread out among multiple remote services 150, 155, as the invention is not limited in this respect.

In some embodiments the host system 110, the owner system 114, the remote service 150 and/or the second remote service 155 may communicate with each other through a network 120. The network may be the Internet, an intranet or other network suitable to connect the host system 110 with the remote service 150.

Figure 2A:
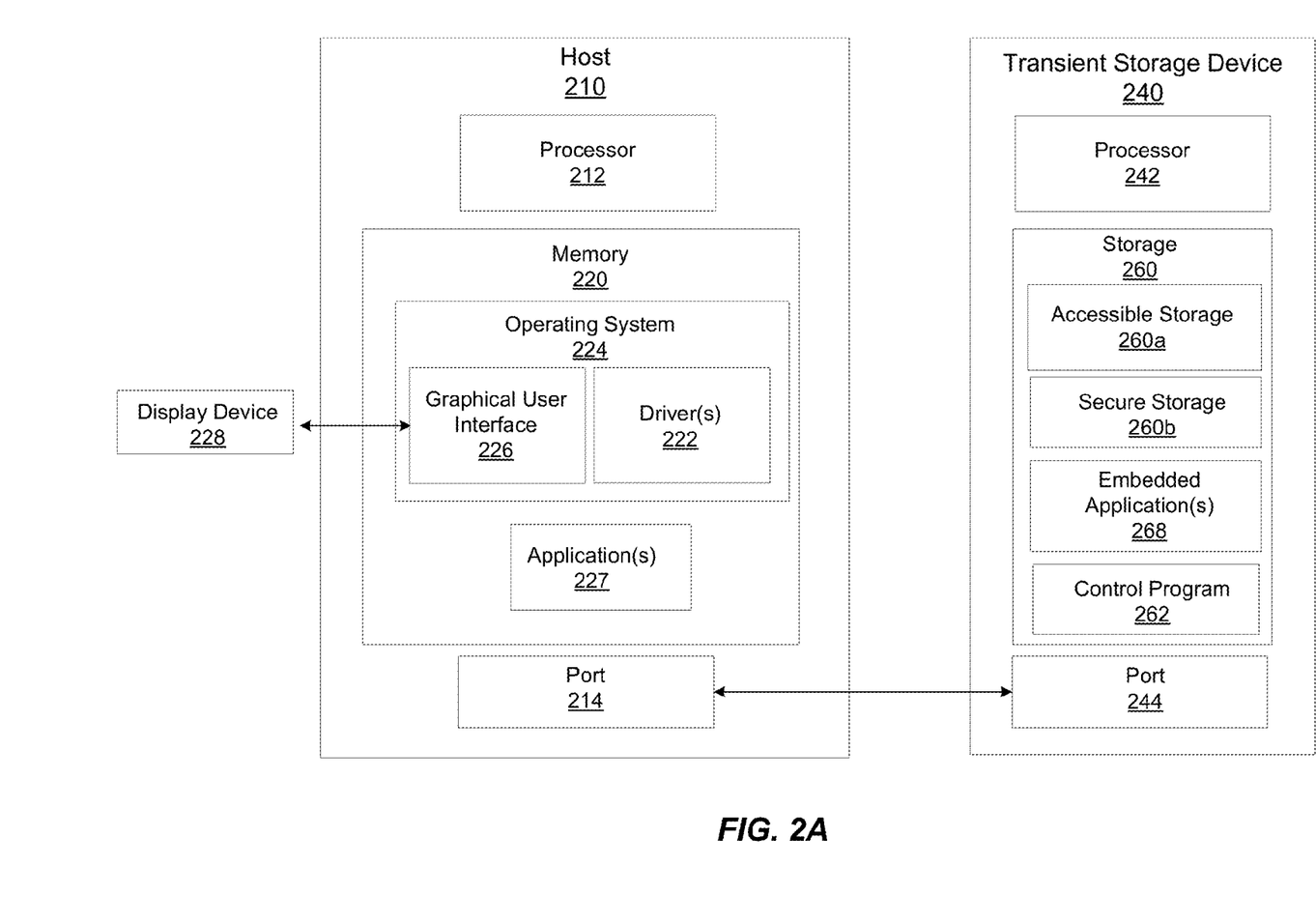
FIG. 2A is a block diagram of components of the host system and the device, according to an embodiment of the invention.

FIG. 2A illustrates components of a host system 210 and a transient storage device 240 for implementing embodiments of the invention. The host system 210 includes a processor 212 and memory 220. The host system 210 also includes an operating system 224 that is executed by the processor 212. In some embodiments, the operating system 224 may be the Microsoft® Windows® Vista® operating system, though other suitable operating systems may be employed, as the present invention is not limited in this respect. The operating system 224 may include a graphical user interface (GUI) 226 for displaying information on a display device 228. The host system 210 also includes a port 214 for communicating with the transient storage device 240. The host system 210 may include one or more applications 227 that are executed on the processor 212 and supported by the operating system 224.

In some embodiments, the host system 210 includes one or more drivers 222 for communicating with the transient storage device 240. The one or more drivers 222 may be provided with the operating system 224. The one or more drivers 222 may be obtained from the remote service 150, a different remote service 155, a remote system, from a device vendor, etc. The one or more drivers 222 may include a silo control component for communicating with silo(s) of the device 240. The silo control component may provide a secure tunneling channel between the device 210 and the remote service 150. Other suitable configurations for the host system 210 may be implemented, as the invention is not limited in this regard.

Device 240 includes non-volatile storage 260, and a port 214 for communication with the host system 210. The non-volatile storage 260 may include non-volatile memory, hard disk space or storage using another suitable storage medium. In some embodiments, the device 240 may include a control program 262, one or more embedded applications 268, and a processor 242 for execution of the control program 262 and the one or more embedded applications 268.

In some embodiments, the storage may include an accessible storage portion 260a and a secure storage portion 260b. For example, a secured transient storage device may include an accessible storage portion 260a and a secure storage portion 260b. The host system 210 is permitted to access the accessible storage portion 260a both when the device 240 is in an authenticated device state and when the device 240 is in an unauthenticated device state, but the host system 210 can access the secure storage portion 260 only when the device 240 is in an authenticated state. Other suitable configurations for the storage device may be employed, as the invention is not limited in this regard.

The host system 210 and the device 240 may be connected through any suitable ports 214, 244 and communicate using any suitable communication protocols. For example, the host system 210 and the device 240 may communicate through a universal serial bus (USB) using the common standard extensible protocol IEEE 1667, according to an embodiment of the invention. In other embodiments, the host system 210 and the device 240 may communicate via any suitable bus type using any suitable associated protocols including, but not limited to: parallel advanced technology attachment (PATA), integrated drive electronics (IDE), enhanced IDE (EIDE), serial advanced technology attachment (SATA), small computer system interface (SCSI), serial attached SCSI (SAS), fibre channel protocol (FCP), and IEEE 1394 high speed serial bus, as the present invention is not limited in this regard. Other suitable communication protocols may be used, as the invention is not limited in this regard.

Figure 2B:
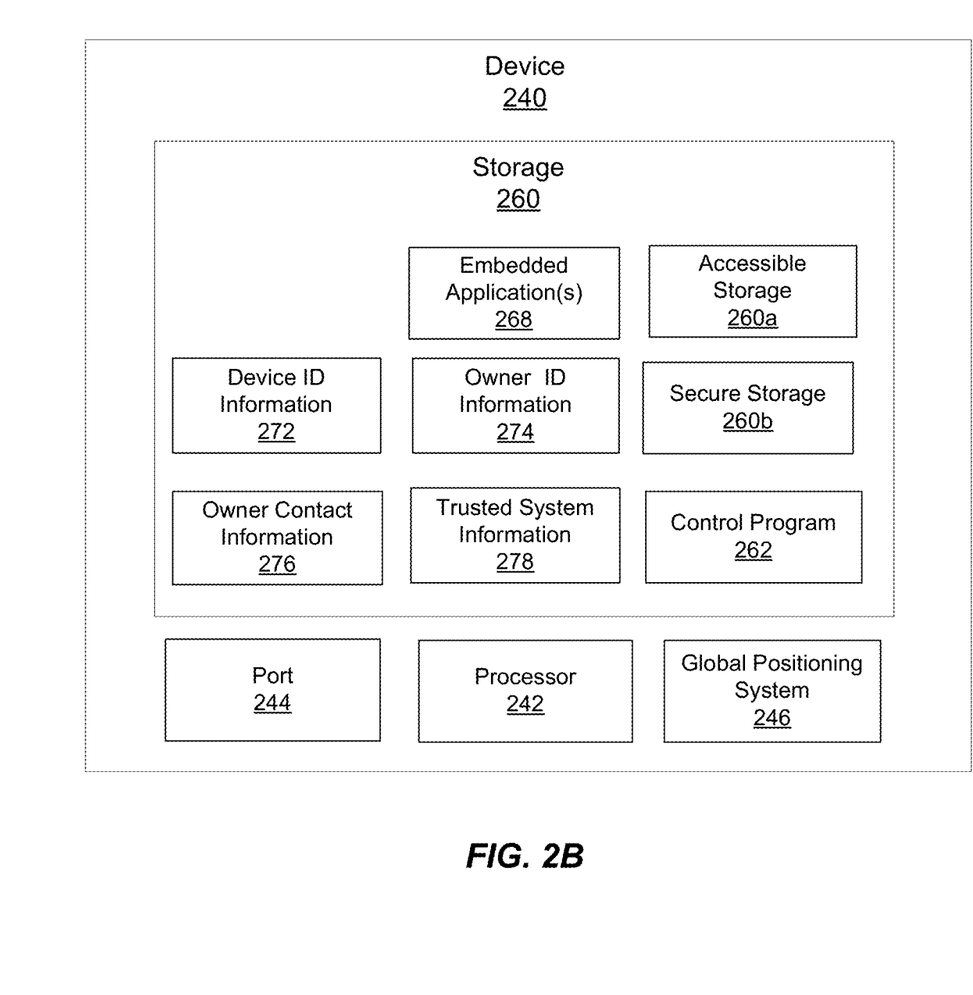
FIG. 2B is a block diagram of components of the device depicted in FIG. 2A, according to an embodiment of the invention.

FIG. 2B further illustrates components of the device 240 and information stored on the device 240, according to an embodiment. In one embodiment, the device storage 260 holds unique device identification (device ID) information 272. In another embodiment, the device ID information 272 includes key information. The device ID information 272 may include hardware-identification information for the device and may be in the form of a secured serial ID. The device ID information 272 may be stored in the device storage 260 at the time of manufacturing, the device ID information may be stored in the device storage 260 before sale of the device 240 to the owner, the owner 240 may store device ID information 272 on the device 240 before the device is lost, and/or portions of the device ID information 272 may be stored on the device 240 at different times by different parties, as the invention is not limited in this respect.

In some embodiments, the device storage 260 holds unique owner identification (owner ID) information 274. The owner ID information 274 may include a digital signature of the owner. Device storage may also include owner contact information 276. The owner contact information 276 may include an email address, a telephone number, a web site, a postal address, etc. The owner ID information 274 and/or the owner contact information 276 may be may be stored in the device storage 260 through the owner's system 212. The owner ID information 264 and/or the owner contact information 276 may be stored in the device storage 260 at the time of sale of the device 240. The owner ID information may be received from a remote service 150 and stored in the device storage 260. The owner ID information 274 may be stored in the device 240 by another party, at a different time, using a different method, as the present invention is not limited in this respect.

In one embodiment, at least some of the embedded applications 268 are preloaded on the device 240 before the owner obtains the device 240. At least some of the embedded applications 268 may be received by the device 240 as device-executable code after the owner obtains the device 240. In another embodiment, at least some of the embedded applications 268 may be loaded on the device 240 when the device is registered 240 with the remote service 150. In another embodiment, at least some of the embedded applications 268 may be loaded on the device 240 from the remote service 150 through a secure tunneling channel provided by the host system 210. The embedded applications 268 may be loaded onto the device by a device provider, may be loaded onto the device 240 after it is acquired by the owner and before the device 240 is lost, may be loaded onto the device 240 after the device is lost, or may be loaded onto the device 240 by another party at a different time, using a different method, as the present invention is not limited in this respect.

Some of the embedded applications 268 may be loaded onto the device 240 at a different time and/or by a different party than others of the embedded applications 268. Some embedded applications 268 may be loaded onto the device 240 at a first time by a first party and supplemented or modified at a different time by a different party, as the present invention is not limited in this respect.

In one embodiment, the one or more embedded applications 268 include one or more device silo(s) or applets. The one or more embedded applications 268 may include an authentication silo for authentication of the device 212 by the host system. The one or more embedded applications 268 may include a silo or applet for establishing a secure channeling tunnel provided by the host system 210. In another embodiment, the one or more embedded applications 268 include custom device-executable code. The custom device-executable code is customized based on information obtained from the owner of the device, and/or customized based on characteristics of the host system.

In some embodiments, the device 240 includes a location system for determining a geographic location of the device, such as a global positioning system (GPS) 246. The embedded applications 268 may include an application that interfaces with the location system 246. The device recovery plan may include providing a location of the device to the remote service 150 and/or the owner's system 114 through the host system 210

In some embodiments, the device 240 may include a device portion of a recovery plan and/or a host system portion of a recovery plan. A device portion of a recovery plan and/or a host system portion of a recovery plan may be included in one or more embedded applications, included in one or more device silos, stored in block storage, or held elsewhere in the device, as the present invention is not limited in this respect. Further explanation of a recovery plan is provided below.

Figure 3A:
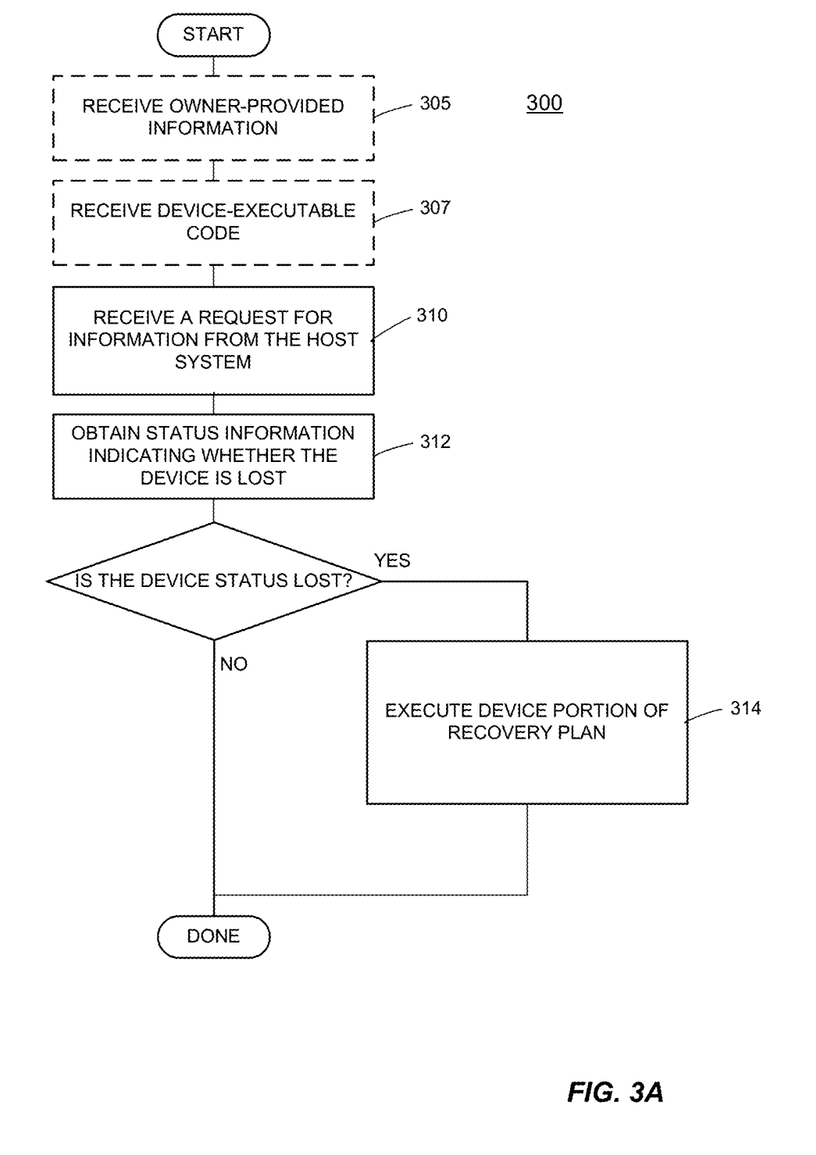
FIG. 3A is a flowchart of a process for identifying and recovering a lost transient storage device that may be implemented on the device, according to an embodiment of the invention.

FIG. 3A depicts a process 300 for identifying and recovering a lost transient storage device 240 connected with a host system 210, according to one embodiment. For illustrative purposes, process 300 will be described with respect to the host system 210 and the device 240 depicted in FIGS. 2A and 2B, and with respect to the owner system 115, the remote service 150 and the network 120 depicted in FIG. 1.

In one embodiment, device 240 receives owner-provided information before the device 240 is lost (step 305). Owner-provided information that may be stored on the device 240 before the device 240 is lost includes, but is not limited to: trusted system information 278, owner ID information 274, owner contact information 276, a device recovery plan, etc. In one embodiment, the owner-provided information is stored on the device 240 when the device 240 is registered with a remote service 150. In another embodiment, the owner-provided information is stored on the device 240 using the owner system 114 when the device 240 is connected with the owner system 114. In yet another embodiment, the owner-provided information may be stored on the device 240 by a seller when the device 240 is sold. The owner-provided information may be stored on the device 240, by the owner, by a remote service 150, or by a third party, as the invention is not limited in this regard. Although receiving the owner-provided information is depicted occurring before the device 112 is lost, in another embodiment, the device 112 may receive owner-provided information after the device 112 is lost, or both before and after the device 112 is lost, as the invention is not limited in this regard.

In one embodiment, device-executable code is received by the device 240 before the device 240 is lost (step 307). Although receiving the device-executable code is depicted occurring before the device 240 is lost, the device-executable code may be received after the device is lost, as the invention is not limited in this respect. In another embodiment, at least some of the owner-provided information and/or device-executable code including at least some of the embedded applications 268 are received by the device from the owner's system 114 before the device is lost. In another embodiment, at least some of the owner-provided information and/or device-executable code including at least some of the embedded applications 268 are received by the device 112 during device registration with a remote service 150. In yet another embodiment, at least some of the owner-provided information and/or device-executable code including at least some of the embedded applications 268 are received by the device from the remote service through a secure tunneling channel provided by the host system 210. At least some at least some of the owner-provided information and/or device-executable code including at least some of the embedded applications 268, may be preloaded on the device 240 or obtained from a different source as the invention is not limited in this regard.

In one embodiment, the device 240 includes a "Found Device" (FD) silo that executes when the host system 110 attempts to authenticate the device 240. The FD silo may be preloaded 240 as an embedded application 268 before the user obtains the device or may be included in device-executable code that is received by the device 240 before or after the device is lost.

The device 240 may receive a request for information from the host system 210 (step 310) when the host system 210 discovers or detects that the device 240 is connected to the host system 210, when the host system 210 is powered on, when the device 240 is powered on, when a user of the host system 210 attempts to access information stored in the device 240 or by the occurrence of any other suitable initiating event. Communication is established between the host system 210 and the device 240 connected to the host system. Establishing communication may include the host system 210 polling the device. The host system 210 may request information for determining which device drivers 222 are required for the device 240. If the host system 210 does not have the correct device drivers 222, the host system 210 may obtain them from the remote system 150 or from some other source. The host system 210 may request device ID information 272 for the device 240, and/or the host system 210 may request some other form of information.

Status information indicating whether the device 240 is lost is then obtained 312. In one embodiment, the status information is determined by the device 240 based on information received from the host system 210. In another embodiment, the status information is determined by a remote service 150 based on information about the device identification information 272 provided by the host system 210. In yet another embodiment, the status information may be determined by the host system 210 based on information provided by the device 240 and information provided by the remote service 150. Additional details regarding determining and obtaining status information are described below with respect to FIGS. 3B and 3C.

If the obtained device status is lost, then a device portion of a recovery plan is executed (step 314). The recovery plan may also include a host system 210 portion to be executed on the host system 210 and/or a remote service portion of a recovery plan to be executed on the remote service 150. Additional details regarding a recovery plan are described below.

Figure 3B:
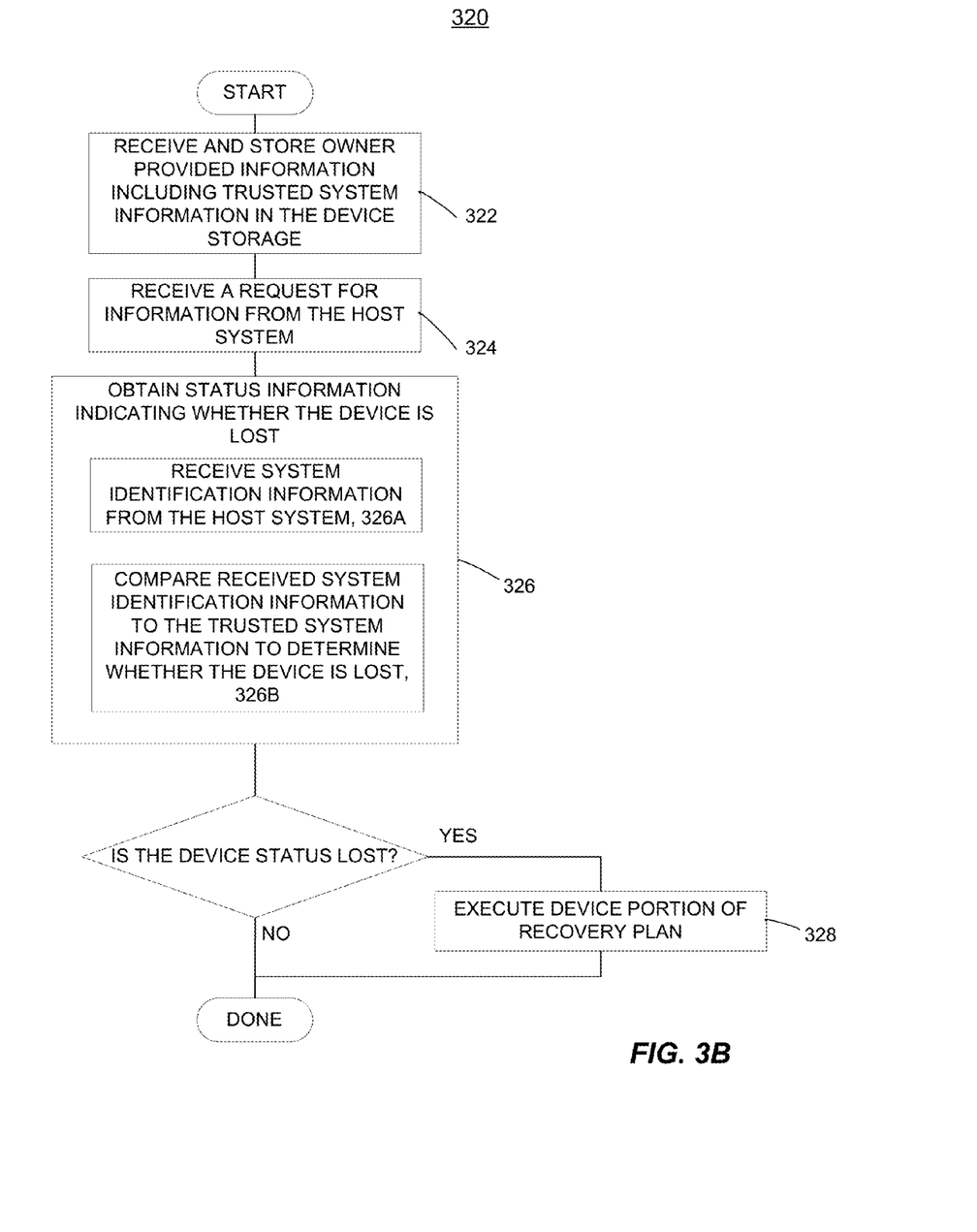
FIG. 3B is a flowchart of another process for identifying and recovering a lost transient storage device showing steps in obtaining a device status, according to an embodiment of the invention.

FIG. 3B depicts an embodiment of a process 320 for identifying and recovering a lost transient storage device 240 connected with a host system 210, where device status is determined in the device 240. In one embodiment, before the device 240 is lost, the device owner stores information in the device storage 260 including trusted system information 276 (step 322). The trusted system information 276 may include information identifying systems associated with the device 240, information identifying systems associated with the device owner, and/or information identifying a group associated with the device 240. After the device 240 is in communication with a host system 210 (step 324), the device 240 receives system identification information from the host system (step 210A). In one embodiment, the system identification information is obtained from the host system in response to execution of the FD silo, or another embedded application 268, of the device 240. The device 240 obtains status information indicating whether the device 240 is lost (step 326) by comparing the received system identification information with the trusted system information 276. If the device 240 is lost, a device portion of the recovery plan is executed (step 328).

Figure 3C:
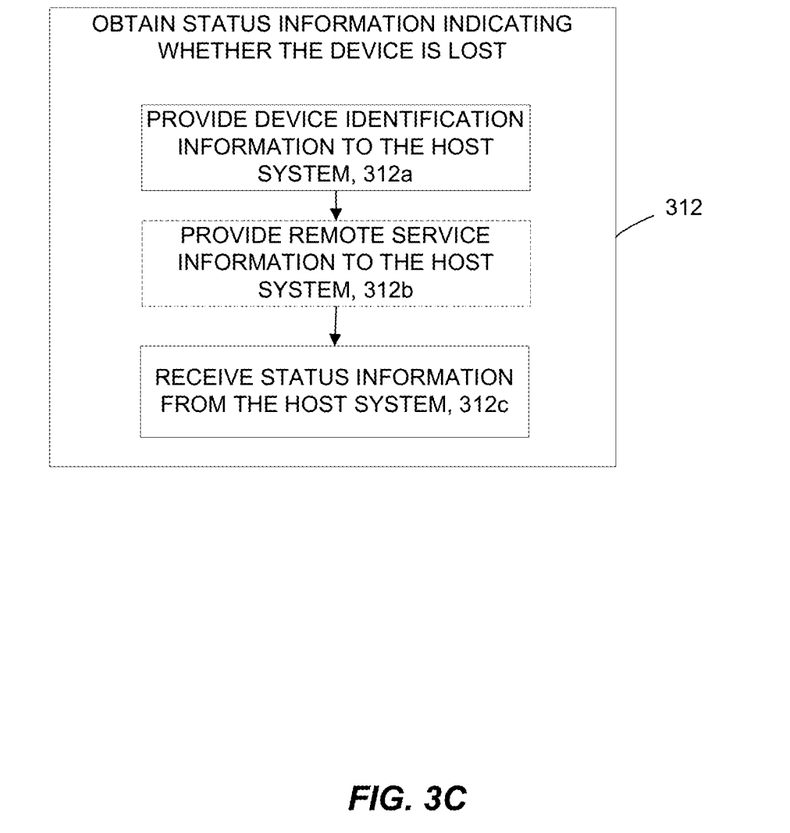
FIG. 3C is a flowchart of another embodiment of the step of obtaining status information that is depicted in FIG. 3A.

FIG. 3C depicts an embodiment of the step of obtaining status information indicating whether the device 240 is lost, in accordance with one embodiment. Obtaining status information may include providing device ID information 272 to the host system 210 (step 312A). The device ID information 272 may be any suitable information that uniquely identifies the device 240. The device 240 may also provide information regarding the remote service 150 to the host system 210 (step 312b). The host system 210 may contact the remote service 150 and submit the device identification information 272 to the remote service 150. In response, the host system 210 may receive status information from the remote service 150 and the device 240 may receive the status information from the host system 210. How the remote service 150 determines a status of the device 240 is described below with respect to FIG. 4. In one embodiment, the host system 210 receives additional information, host executable code and/or device-executable code from the remote service 150. Interaction between the host system 210 and the remote service 150, and interaction between the host system 210 and the device 240 are further described below with respect to FIG. 5.

Figure 4:
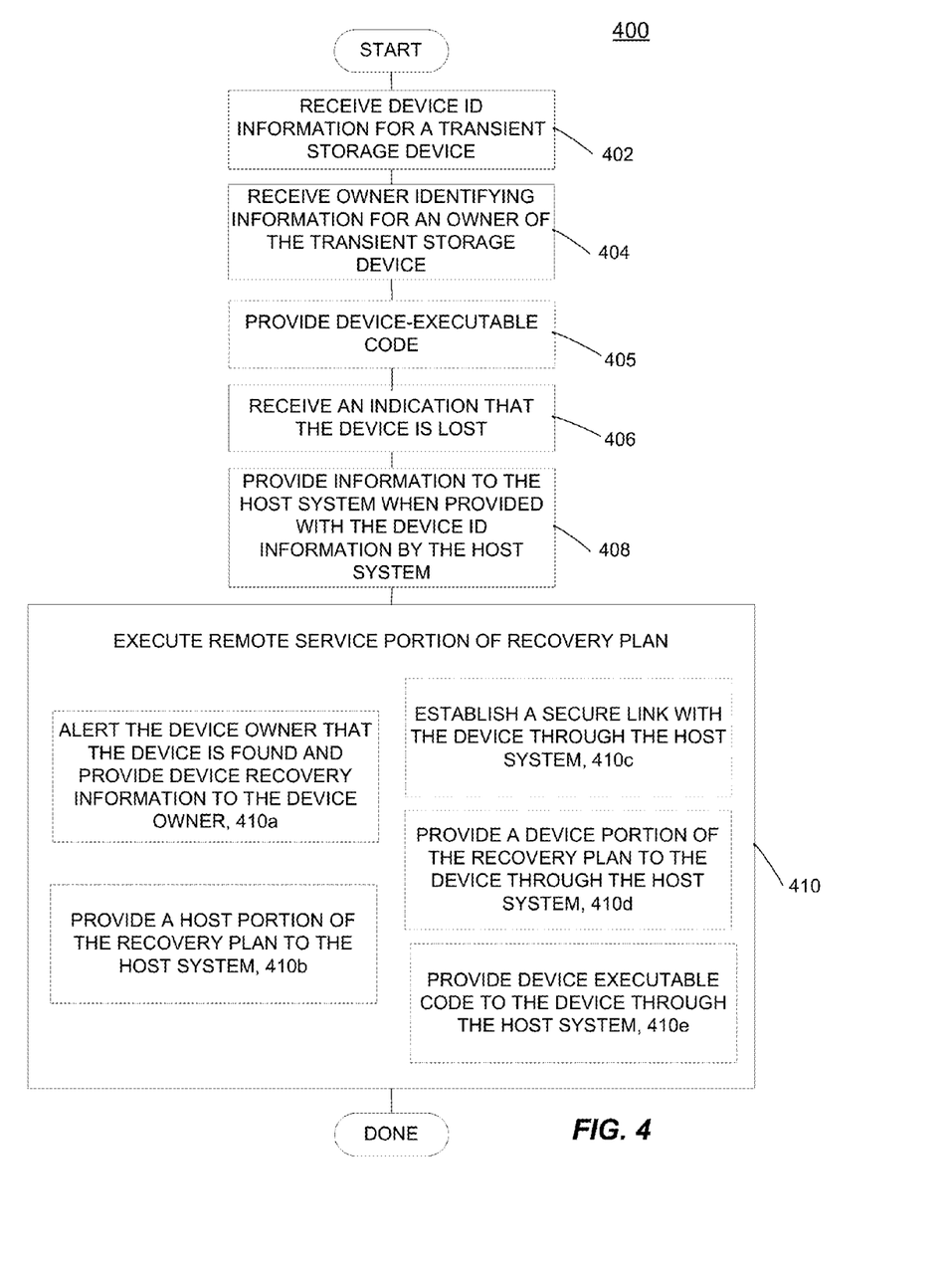
FIG. 4 is a flowchart of a process for identifying and recovering a lost transient storage device using a remote service, according to an embodiment of the invention.

FIG. 4 depicts a process 400 for identifying and locating a transient storage device 240 connected with a host system 210 using a remote service 150. Although the process 400 is described with respect to one remote service 150, steps of the process may be conducted by different remote services, as the invention is not limited in this regard. Device ID information 272 is received for the transient storage device 240 by the remote service 150 (step 402). The device ID information 272 may be provided by the owner of the device 240, a provider of the device 240 or another party. Owner identification information 273 may also be received by the remote service 150. In one embodiment, owner contact information 276 may be received by the remote service 150 (step 404). Owner identification information 273 and/or owner contact information 276 may be provided by the owner, by a seller of the device 240 or by a third party, as the invention is not limited in this regard. The remote service 150 may also receive an indication of a selection of a recovery plan from the owner, a vendor or a third party. The remote service 150 may be described as a device recovery service. Steps 402 and 404 may be part of a process of registering the device 240 with the device recovery service 150.

In one embodiment, the remote service 150 provides the device 240 with device-executable code, which may include an embedded application 268, during registration of the device 240 (step 405). The embedded application 268 may be a service-specific embedded application and/or a host-specific embedded application. The embedded application 268 may be customized based on selections that are made during registration of the device 240 with the remote service 150. The selections may include a choice of a recovery plan. The embedded application 268 provided by the remote service 150 may be customized based on owner-provided information. The embedded application 268 may include a FD silo that executes when a host system initiates authentication. The embedded application 268 may include an application for establishing a secure tunneling connection with the remote service. In another embodiment, the device 240 is preloaded with an embedded application 268 before the owner obtains the device 240.

When the device 240 is lost, the remote service 150 receives an indication that the device 240 is lost (step 406). The owner may contact the remote service 150 with the information that the device 240 is lost or another party may contact the remote service 150 with the information that the device 240 is lost. The remote service 150 records and stores the lost state of the device 240. When a host system 210 contacts the remote service 150 and provides device ID information 272 matching the device ID information of the lost device 240, the remote service 150 provides information to the host system 210 (step 408). The information provided to the host system 210 may include an indication that the device state is lost and/or contact information for the device owner.

The remote service 150 executes a remote service portion of the recovery plan (step 410). In one embodiment, executing a remote service portion of the recovery plan includes alerting the device owner that the device 240 has been found and providing device recovery information to the device owner (step 410a). Device recovery information may include host system identification information, a location of the device 240 provided by a global positioning system (246) on the device, a location of the host system 210 provided by the host system 210 and/or identifying information for the device finder or user of the host system 210, In another embodiment, executing a remote service portion of the recovery plan includes providing a host portion of the recovery plan to the host system 210 (step 410b). In one embodiment, this includes the remote service 150 providing a silo control component to the host system 210 that corresponds to an FD silo on the device 240. In another embodiment, the remote service 150 provides the host system 210 with an application for providing a pass-through for a secure tunneling channel between the remote service 150 and the device 240. In one embodiment, executing a remote service portion of the recovery plan includes establishing a secure link with the device through the host system (step 410c). For example, the remote service 150 may initiate a secure tunneling channel between the remote service 150 and the device 240 through the host system 210. The remote service 150 and the device 240 may perform mutual authentication through the secure tunneling channel. The remote service 150 may provide device-executable code to the device 240 through the host system 210 (step 410e). The device-executable code may be provided through the secure tunneling channel after mutual authentication. The secure tunneling channel may allow the remote service 150 to directly control the device 240. The device-executable code received from the remote service 150 through the host system 210 may be customized based on selections that are made during registration of the device 240 with the remote service 150 and/or customized based on owner-provided information. The selections may include a choice of a recovery plan. In another embodiment, a device portion of the recovery plan may be provided to the device 240 through the host system 210 (step 410d).

Figure 5:
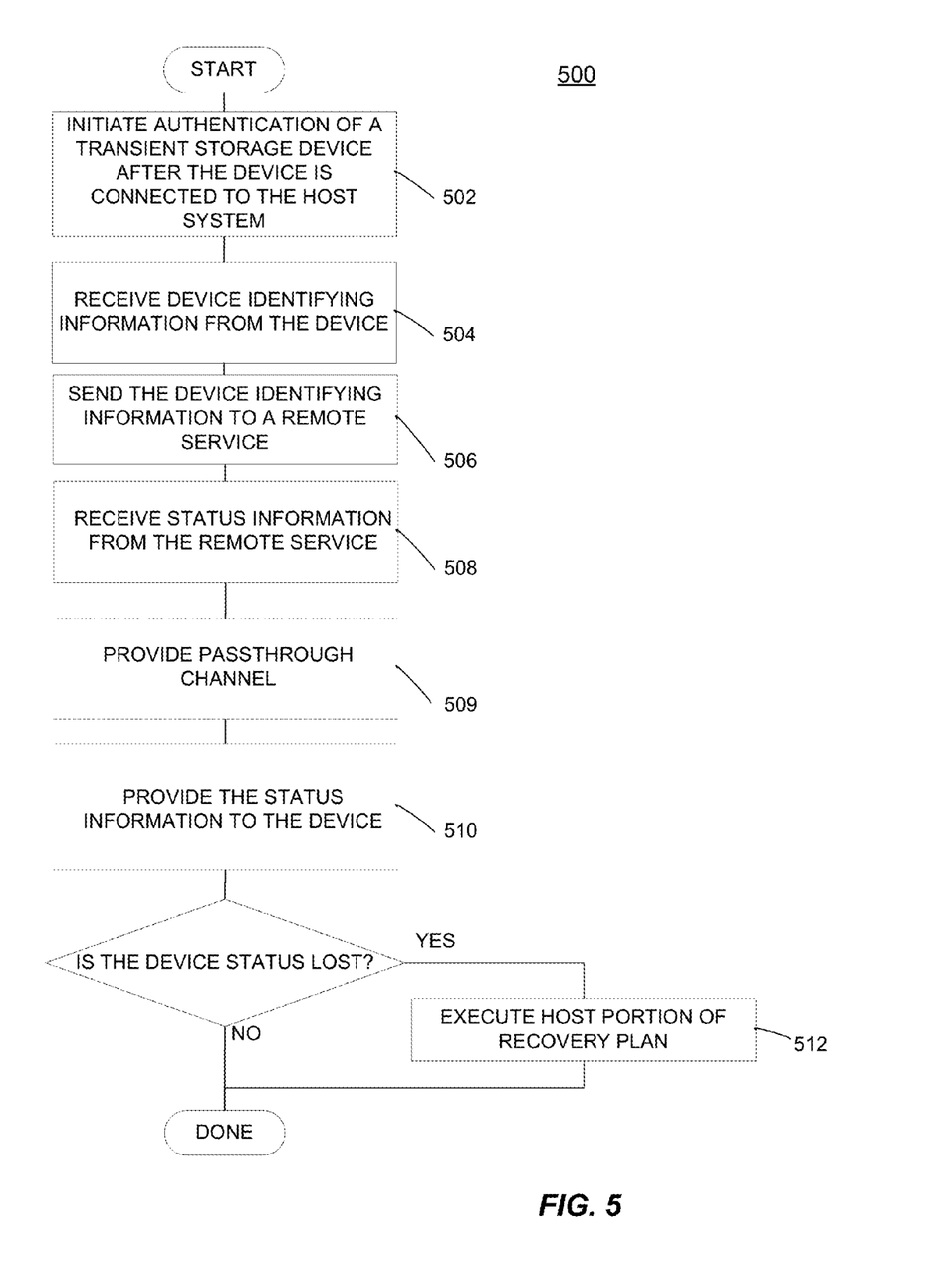
FIG. 5 is a flowchart of a process for identifying and recovering a lost transient storage device using a host system, according to an embodiment of the invention.

FIG. 5 depicts a process 500 for identifying and locating a transient storage device 240 connected with a host system 210 using the host system 210. Authentication is initiated with the transient storage device 240 after the device 240 is connected to the host system 210 (step 502). As described above, if the host system 210 does not have drivers 222 for communicating with the device 240, the host system 210 may obtain device drivers 222 from the remote service 150 or another source. In some embodiments, the host system 210 receives device ID information 272 from the device 240 (step 504). The host sends the device ID information 272 to the remote service 150 (step 506). The host system 210 receives status information from the remote service 150 (step 508). The host system 210 provides status information to the device 240 (step 510). If the device status is lost then a host portion of the device recovery plan may be executed on the host system 210. (512).

In one embodiment, the host may provide a secure tunneling channel or a pass-through channel between the remote service 150 and the device 240 (step 509). As described above, device-executable code and other information may be downloaded from the remote service 150 onto the device 240 through the channel. The remote system 150 may control the device 240 through the channel. The device 240 may send information, e.g. device location information, to the remote service 150 through the channel.

In some embodiments, host system 210 access to a secure data partition of storage of the transient storage device 240 is blocked before status information indicating whether the device 240 is lost is received. The device 240 may enable queries for owner information in an accessible data portion of the device 240.

Turning now to execution of the device recovery plan, as described above a portion of the recovery plan may be executed on the device 240, a portion of the recovery plan may be executed on the host system 210, a portion of the recovery plan may be executed on the remote service 150 and/or a portion of the device recovery plan may be executed on any combination of the aforementioned. The recovery plan may include providing information to a user of the host system 210, providing information to the remote service 150 and/or providing information to the device owner, in accordance with different embodiments. The recovery plan may include executing an embedded application on the device 240, may include executing an application on the host system 210, may include executing an application on the remote service 150 and/or may include any combination of the aforementioned. In one embodiment, the device embedded application that is executed as part of the recovery plan is stored on the device 240 before the device is lost. In another embodiment, the device embedded application executed as part of the recovery plan is received from the remote service 150 through the host system 210. In one embodiment, the application executed on the host system 210 as part of the recovery plan is obtained from the device 240. In another embodiment, the application executed on the host system 210 as part of the recovery plan is obtained from the remote service 250.

In one embodiment, the recovery plan includes providing recovery information to the user of the host system 210. Recovery information may include, contact information for the device owner, contact information for a group to which the owner belongs, contact information for a device recovery service 150, device identification information and/or instructions for returning the device 240. In some embodiments, the recovery information may include a printable pre-paid mailing label to allow the host system user to mail the device 210 to the owner or to the remote service 150. The recovery information may be provided to the host system 210 by the device, the remote service 150 or both.

In another embodiment, the recovery plan may include automatically sending a communication to the device owner alerting the device owner that the lost device 240 has been found. In one embodiment, the communication is sent through the host system 210. In another embodiment, the communication is sent by the remote service 240. The communication may be in the form of an email, a phone call, a text message or any other suitable form communication, as the invention is not limited in this respect. The communication may include identification information for the host system 240 and/or location information for the device or the host system.

In yet another embodiment, the device may have global positioning system (GPS) 246 capabilities. Executing a recovery plan may include activating the GPS 246 of the device 240 to obtain location information and sending the device location information to the remote service 150, and/or to the owner in a communication. In another embodiment the system may have GPS capabilities and executing the recovery plan may include obtaining location information for the host system 210 and sending the host system location information to the remote service 150, and/or to the owner in a communication.

In one embodiment, a device portion of a recovery plan includes requesting further information from the user of the host system 210, and providing recovery information to the host system 210 where an amount and a type of the recovery information provided is based on the further information from the user. For example, a lost device 240 may not release any owner contact information to a total stranger, but if the user of the host system 210 can provide further relevant information: such as whether the user is part of the same organization as the owner, whether the user has a particular security clearance, etc., then the lost device 240 may release some owner contact information to the user based on the further information provided by the user. The lost device 240 may ask the user of the host system 210 for further information.

In an embodiment where host identification information is compared to trusted host information to determine if the device 240 is lost, if the host identification information establishes that the host system 210 belongs to a group that is related to the group of the device 240, then more recovery information may be provided to the host system 210 than if the host system 210 has no relationship to the device 240.

In one embodiment the device recovery plan may include establishing a communication tunnel between the device 240 and a remote service 150 and/or a remote service (such as the owner's system 112). The communication tunnel may be hosted by the host system 210. The communication tunnel may be used to send information from the device 240 to a remote service 150 or a remote service and/or may be used to send information from a remote service 150 or a remote service to the device 240. The tunnel may be encrypted using key information of the device 240. Executing a host portion of the recovery plan may include hosting the tunnel.

In another embodiment, the device portion of the device recovery plan may include executing an embedded application 268 of the storage device 240. The embedded application may have been stored on the device 240 before the device 240 was lost or the embedded application may have been obtained from the remote service 150 through the host system 210.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

In addition, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology, may operate according to any suitable protocol, and may include wireless networks, wired networks or fiber optic networks.

In addition, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. The terms "computer readable medium", "computer readable media", "computer storage medium", "computer storage device", and the like are strictly limited to being an apparatus(es) or article(s) of manufacture or the like.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In addition, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

In addition, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method performed on a computing device comprising at least one processor and memory, the method comprising:
communicatively coupling the computing device with a host;
receiving, by the computing device from the host to which the computing device is communicatively coupled, status information about the computing device that was provided to the host from a remote service, the status information indicating that the computing device is lost or stolen;
establishing, responsive to the received status information, a secure tunneling channel between the computing device and the remote service, where the secure tunneling channel passes through the host and is provided by the host; and
mutually authenticating, by the computing device with the remote service, via the secure tunneling channel;
communicating, by the computing device in response to the mutual authenticating, data through the host with the remote service over the secure tunneling channel between the computing device and the remote service, where the computing device, the host, and the remote service are separate and distinct from each other.

2. The method of claim 1 where the computing device is part of a phone.

3. The method of claim 1 where the communicating is part of a recovery plan.

4. The method of claim 1 where the data includes location information.

5. The method of claim 1 where the computing device is controllable by the remote service via the secure tunneling channel.

6. The method of claim 1 where an application that establishes the secure tunneling channel is provided to the computing device via the host by the remote service.

7. The method of claim 1 where the communicated data comprises unique identification information that identifies contact information for an owner of the computing device.

8. At least one computer storage device that comprises computer-executable instructions that, based on execution by at least one processor of a computing device that also includes memory, configure the computing device to perform actions comprising:
   communicatively coupling the computing device with a host;
   receiving, by the computing device from the host to which the computing device is communicatively coupled, status information about the computing device that was provided to the host from a remote service, the status information indicating that the computing device is lost or stolen;
   establishing, responsive to the received status information, a secure tunneling channel between the computing device and the remote service, where the secure tunneling channel passes through the host and is provided by the host; and
   mutually authenticating, by the computing device with the remote service, via the secure tunneling channel;
   communicating, by the computing device in response to the mutual authenticating, data through the host with the remote service over the secure tunneling channel between the computing device and the remote service, where the computing device, the host, and the remote service are separate and distinct from each other.

9. The at least one computer storage device of claim 8 where the computing device is part of a phone.

10. The at least one computer storage device of claim 8 where the communicating is part of a recovery plan that was selected by an owner of the computing device before the computing device was reported lost or stolen.

11. The at least one computer storage device of claim 8 where the data includes location information that identifies a location of the computing device.

12. The at least one computer storage device of claim 8 where the computing device is controllable by the remote service via the secure tunneling channel.

13. The at least one computer storage device of claim 8 where an application that establishes the secure tunneling channel is provided to the computing device via the host by the remote service.

14. The at least one computer storage device of claim 8 where an application that establishes the secure tunneling channel is stored in the memory of the computing device.

15. A computing device comprising:
   at least one processor;
   memory coupled to the at least one processor; and
   a port coupled to the at least one processor and memory and via which the computing device is configured to communicatively coupling the computing device with a host;
   the port via which the computing device is further configured to receive, from the host to which the computing device is communicatively coupled, status information about the computing device that was provided to the host from a remote service, the status information indicating that the computing device is lost stolen;
   the port via which the computing device is further configured to establish, responsive to the received status information, a secure tunneling channel between the computing device and the remote service, where the secure tunneling channel passes through the host and is provided by the host; and
   the port via which the computing device is further configured to mutually authenticate with the remote service via the secure tunneling channel;
   the port via which the computing device is further configured to communicate, in response to the computing device mutual authenticating with the remote service via the secure tunneling channel, data through the host with the remote service over the secure tunneling channel between the computing device and the remote service, where the computing device, the host, and the remote service are separate and distinct from each other.

16. The computing device of claim 15 where the computing device is part of a phone, or where the communicating is part of a recovery plan.

17. The computing device of claim 15 where the data includes location information.

18. The computing device of claim 15 where the computing device is controllable by the remote service via the secure tunneling channel.

19. The computing device of claim 15 where an application that establishes the secure tunneling channel is provided to the computing device via the host by the remote service.

20. The computing device of claim 15 where an application that establishes the secure tunneling channel is stored in the memory of the computing device.

* * * * *